No. 611,326. Patented Sept. 27, 1898.
W. T. JONES.
HAY PRESS FEEDING FORK.
(Application filed Feb. 28, 1898.)
(No Model.)
Fig. 1
Fig. 2
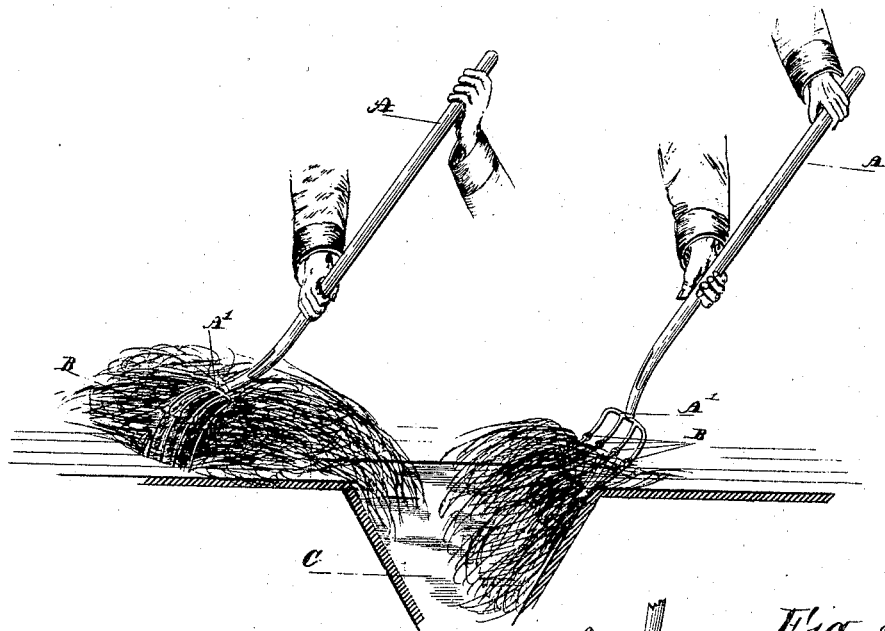
Fig. 3
Fig. 4
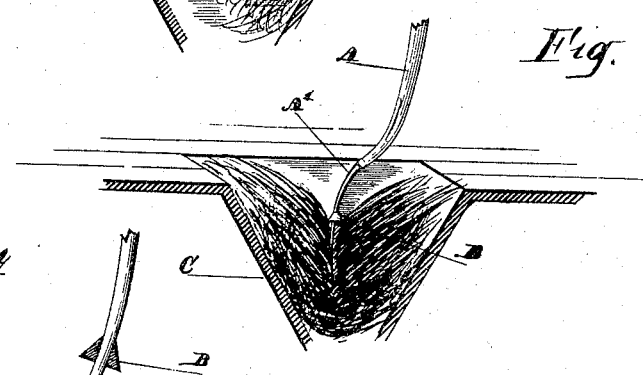
Witnesses.
J. A. Groat.
S. V. Zbanek.
Inventor.
William T. Jones
By J. M. St. John.
Atty.

UNITED STATES PATENT OFFICE.

WILLIAM T. JONES, OF CEDAR RAPIDS, IOWA.

HAY-PRESS FEEDING-FORK.

SPECIFICATION forming part of Letters Patent No. 611,326, dated September 27, 1898.

Application filed February 28, 1898. Serial No. 672,113. (No model.)

*To all whom it may concern:*

Be it known that I, WILLIAM T. JONES, a citizen of the United States, residing at Cedar Rapids, in the county of Linn and State of Iowa, have invented certain new and useful Improvements in Hay-Press Feeding-Forks; and I do hereby declare the following to be a full, clear, and exact description of the invention, such as will enable others skilled in the art to which it appertains to make and use the same.

The object of this invention is to render a hay-fork more efficient in the operation of feeding a hay-press without at the same time impairing its usefulness to any considerable extent for ordinary purposes.

The invention consists in the application to the tines of a fork, some distance down from the head, of buttons or enlargements which, though capable of forcing compacted hay into the throat of a hay-press, do not specially interfere with the usual operation of the fork.

In the accompanying drawings, forming a part of this specification, Figure 1 is a view of a fork embodying my invention as used for drawing hay toward the operator or toward a hay-press hopper. Fig. 2 is a view of the same as used in pitching hay. Fig. 3 is a fragmentary side view of the same as used in forcing hay into the hopper or throat of a hay-press. Fig. 4 is a fragmentary view of a fork-tine with one of the buttons in section thereon.

Similar letters of reference indicate corresponding parts.

In the feeding of hay-presses the ordinary hay-fork is not satisfactory, owing to the length of the tines, the head which serves to force the hay into the baling-chamber being relatively too high when the points of the tines strike to carry the hay well in front of the plunger. It is customary, therefore, to cut off the tines of an ordinary fork to adapt it for this particular purpose. The effect of this is, however, to spoil the true curvature of the fork, without which the fork cannot be used conveniently or advantageously either in pitching hay away from the operator or drawing it toward him. It also greatly reduces the holding capacity of the fork, as will be evident. This invention is designed to secure the advantages of short tines for hay-press feeding without either shortening the tines or changing their relative curvature.

Referring now to the drawings, A designates a four-tined fork of the usual construction. To the tines are attached conical buttons or thimbles B at points some distance down from the fork-head A'. In practice these buttons are made with a practically flat lower end, tapering therefrom to but little larger or no larger than the tine at the upper end. This enables them to hold the hay firmly for downward pressure in the hopper C, which is supposed to lead to a hay-press chamber, (not shown,) but admits of the fork being easily withdrawn. The buttons may be formed integral with the fork-tines or may be driven thereon for permanent or temporary use, as desired.

It is to be noted that in loose hay the buttons, though of course obstructing the passage of the tines through the hay, do not entirely prevent their insertion clear to the head, and the fork has thus practically the same capacity as though the buttons were not used. Used as shown in Fig. 1 the fork has the full efficiency of an ordinary fork; but when used in compacted hay, as in Fig. 3, the penetration of the tines is practically limited by the buttons and the desired results as a hay-press feeding-fork are fully attained.

It will be evident that to adapt any fork for hay-press use it is but necessary to provide a series of these buttons having holes fitting the tines at the proper distance from the fork-head. Such buttons may be driven on or off at will and in a moment.

Having thus described my invention, what I claim as new, and desire to secure by Letters Patent, is—

1. A fork for feeding hay-presses, and other purposes, having its tines provided, at some distance down from the head, with buttons or thimbles, substantially as described.

2. The combination with a hay-fork, of a series of conical buttons or thimbles secured to the tines some distance down from the head of the fork.

3. The combination with a hay-fork, of a series of conical thimbles or buttons attached to the tines at some distance from the fork-head, and with their bases downward.

In testimony whereof I affix my signature in presence of two witnesses.

WILLIAM T. JONES.

Witnesses:
J. M. ST. JOHN,
J. F. GROAT.